United States Patent
Grammel et al.

(10) Patent No.: US 8,713,541 B2
(45) Date of Patent: Apr. 29, 2014

(54) MODEL MATCHING FOR TRACE LINK GENERATION

(75) Inventors: Birgit Grammel, Dresden (DE); Stefan Kastenholz, Dresden (DE)

(73) Assignee: SAP AG, Walldorf (DE)

(*) Notice: Subject to any disclaimer, the term of this patent is extended or adjusted under 35 U.S.C. 154(b) by 193 days.

(21) Appl. No.: 13/339,528

(22) Filed: Dec. 29, 2011

(65) Prior Publication Data

US 2013/0174129 A1 Jul. 4, 2013

(51) Int. Cl.
*G06F 17/30* (2006.01)

(52) U.S. Cl.
USPC .......................................... 717/136; 707/780

(58) Field of Classification Search
USPC ........................................................ 717/136
See application file for complete search history.

(56) References Cited

U.S. PATENT DOCUMENTS

| | | | |
|---|---|---|---|
| 5,838,564 A * | 11/1998 | Bahorich et al. | 702/16 |
| 2010/0131451 A1* | 5/2010 | FitzMaurice et al. | 706/54 |
| 2012/0042299 A1* | 2/2012 | Perrin et al. | 717/104 |
| 2013/0174129 A1* | 7/2013 | Grammel et al. | 717/136 |

OTHER PUBLICATIONS

AMW Use Case—Metamodel comparison, Eclipse foundation (Published Jan. 5, 2007) retrieved from http://web.archive.org/web/20070105205559/http://www.eclipse.org/gmt/amw/usecases/compare/ on Aug. 26, 2013.*
'ATL' [online]. "Atlas transformation language," 2012, [retrieved on Jul. 10, 2012]. Retrieved from the Internet: URL: <http://www.eclipse.org/m2m/atl/> 2 pages.
'Eclipse' [online]. "About MOFscript," 2012, [retrieved Oct. 25, 2012]. Retrieved from the Internet: URL:<http://www.eclipse.org/gmt/mofscript/> 2 pages.
OpenArchitectureWare working group' [online]. "openArchitectureWare," 2012, [retrieved on Jul. 10, 2012]. Retrieved from the Internet: URL:< http://www.eclipse.org/gmt/oaw/> 2 pages.
Aizenbud-Reshef et al., "Model Traceability," IBM Systems Journal, 2006, 45(3):515-526.
Alanen et al., "Difference and Union of Models," UML 2003—The Unified Modeling Language, Apr. 2003, 20 pages.
Brun et al., "Model differences in the eclipse modeling framework," Special Issue on Model-Driven Software Development, Apr. 2008, 9(2):29-34.
Choi et al., "A Survey of Ontology Mappings," SIGMOD Rec., Sep. 2006, 35(3):34-41.
Czarnecki et al., "Feature-based survey of model transformation approaches," IBM Systems Journal, 2006, 45 (3):621-645.
Ehrig et al., "Fundamental Theory for Typed Attributed Graph Transformation," Proceedings of ICGT, 2004, 3256:161-177.

(Continued)

*Primary Examiner* — Don Wong
*Assistant Examiner* — Theodore Hebert
(74) *Attorney, Agent, or Firm* — Fish & Richardson P.C.

(57) ABSTRACT

Implementations of the present disclosure include methods, systems, and computer-readable storage mediums for identifying matching elements between a source model and a target model comprising receiving a source model and a target model, the source model and the target model each being stored in computer-readable memory; processing the source model and the target model to generate a plurality of similarity values, each similarity value being associated with an element of the source model and an element of the target model; generating a similarity value construct based on the plurality of similarity values and elements of the source model and the target model; and identifying matching elements between the source model and the target model based on the similarity value construct.

18 Claims, 7 Drawing Sheets

(56) References Cited

OTHER PUBLICATIONS

Ehrig et al., "Fundamentals of Algebraic Graph Transformation," Springer, Jul. 2006, 19 pages.
Garey et al., "Computers and Intractability: A Guide to the Theory of NP-Completeness," W. H. Freeman & Co, 1990, 357 pages.
Grammel et al., "A Generic Traceability Frame-Work for Facet-Based Traceability Data Extraction in Model-Driven Software Development," Proceedings of the 6th ECMFA Traceability Workshop, Jun. 2010, pp. 7-14.
IEEE Standard Glossary of Software Engineering Terminology, Std 610.12-1990. IEEE, 1990, 84 pages.
Jouault, "Loosely coupled traceability for ATL," Proceedings of the ECMDA Traceability Workshop, 2005, 9 pages.
Koepcke et al., "Frameworks for entity matching: A Comparison," Data and Knowledge Engineering, 2009, pp. 1-14.
Lin et al., "DSMDiff: a Differentiation Tool for Domain-Specific Models," European Journal of Information Systems, 2007, 16(4):349-361.
Peter Mucha, Musterbasiertes abbilden von metamodellen, Master's thesis, TU Dresden, Germany, Oct. 2010, 117 pages.
Neuhaus et al., "An Error-Tolerant Approximate Matching Algorithm for Attributed Planar Graphs and Its Application to Fingerprint Classification," Structural, Syntactic, and Statistical Pattern Recognition, Lecture Notes in Computer Science, 2004, 3138:180-189.
Object Management Group (OMG), "Meta Object Facility (MOF) 2.0 Query/View/Transformation Specification, Version 1.0" Apr. 2008, 240 pages.
Gøran K. Olsen et al., "Scenarios of Traceability in Model to Text Transformations," Proceedings of the Third European Conference on Model Driven Architecture Foundations and Applications, ECMDA 2007, Jun. 2007, Lecture Notes in Computer Science 4530, pp. 144-156.
Rahm et al., "A survey of approaches to automatic schema matching," The VLDB Journal, 2001, 10(4):334-350.
Ramesh et al., "Towards Reference Models for Requirements Traceability," IEEE Transactions on Software Engineering, 2001, 21:1-54.
Ritsko et al., "Preface: special issue on model-driven software development," IBM Systems Journal, 2006, 45(3): 449-450.
Schmidt et al., "Constructing difference tools for models using the siDiff framework," Proceedings of ICSE, 2008, 1-2.
Shvaiko et al., "A Survey of Schema-Based Matching Approaches," Journal on Data semantics, 2005, 4:146-171.
Stahl et al., "Model Driven Software Development," John Wiley & Sons, 2006, 225 pages.
Vanhooff et al., "Traceability as input for model transformations," Proceedings of the ECMDA Traceability Workshop, 2007, 10 pages.
Konrad Voigt et al., "MatchBox: Combined Meta-model Matching for Semi-automatic Mapping Generation," In Proceedings of the SAC2010, Mar. 2010, 8 pages.
Konrad Voigt et al., "Metamodel Matching Based on Planar Graph Edit Distance," Proceedings of the International Conference on Model Transformation, Theory and Practice of Model Transformation, ICMT2010, Jun.-Jul. 2010, 15 pages.
Grammel et al., "Model Matching for Trace Link Generation in Model-Driven Software Development," Model Driven Engineering Languages and Systems, Lecture Notes in Computer Science vol. 7590, 2012: 609-625.
Walderhaug et al., "Towards a Generic Solution for Traceability in MDD," ECMDA Traceability Workshop (ECMDA-TW), 2006 Proceedings, Jul. 10, 2006, 25 pages.

* cited by examiner

MODEL MATCHING FOR TRACE LINK GENERATION

BACKGROUND

Model-driven software development (MDSD) is the automatic (or semi-automatic) generation of software systems from models across multiple stages. This process can entail the step-wise refinement of models, where the last development stage results in the generation of executable source code. This last development step falls into the category of model-to-text transformations and is not limited to source code generation. Generally the output is string-based and any form of text can be possible. The model transformations preceding the last development step are referred to as model-to-model transformations.

A model transformation can be executed through a transformation engine, which understands and processes a transformation program, being an instance of a corresponding transformation language. A transformation program defines how an output (e.g. source code of a particular programming language) is constructed depending on model data used as input. To understand which output elements were generated by which rule in the transformation program on the basis of which model input elements, traceability data is employed between the generated output, the transformation program, and the input models.

Traceability is the degree to which a relationship can be established between two or more products of the development process, in particular, products having a predecessor-successor or master-subordinate relationship to one another. For example, the degree to which the requirements and design of a given software component match. Traceability data in MDSD can be understood as the runtime footprint of model transformation execution. Trace links provide this kind of information by associating input and output elements with respect to the execution of a certain transformation rules.

SUMMARY

Implementations of the present disclosure include computer-implemented methods including the actions of identifying matching elements between a source model and a target model. The method comprises receiving a source model and a target model, the source model and the target model each being stored in computer-readable memory; processing the source model and the target model to generate a plurality of similarity values, each similarity value being associated with an element of the source model and an element of the target model; generating a similarity value construct based on the plurality of similarity values and elements of the source model and the target model; and identifying matching elements between the source model and the target model based on the similarity value construct.

The implementation can optionally include one or more of the follow features. For instance, the target model is provided based on a transformation of the source model. Also, the method can include converting a data structure of the source model to a data structure of a common data model. Additionally, the method can include converting a data structure of the target model to a data structure of a common data model. Other examples include the plurality of similarity values are based on similarity measures, the similarity measures including attribute similarity measures, connection similarity measures and instance-of similarity measures; the processing further including determining the similarity value for each combination of the elements of the source model and the elements of the target model; the processing further including comparing an attribute of each element of the source model to an attribute of each element of the target model; the processing further including propagating the similarity values of child combinations of elements of the source model and elements of the target model to respective parent combinations of elements of the source model and elements of the target model. Another example includes the processing further including determining, for each combination of elements of the source model and elements of the target model, corresponding combinations of elements of a source meta-model and elements of a target meta-model; and propagating a similarity value of the corresponding combinations of elements of the source meta-model and the elements of the target meta-model to the respective combinations of elements of the source model and elements of the target model. The method further including extracting one or more trace links based on the matching elements, each trace link associating an input element of the source model to an output element of the target model in view of a transformation rule.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to generation of trace links in model driven software. In some implementations, a source model can be transformed to a target model. The source model and the target model can each be mapped to graphs that can include elements such as graph nodes (e.g., entities) and data nodes (e.g., attributes). The source model and the target model are input to a traceability model matching system that creates a mapping between the elements of the source model and the target model. This mapping is construed to extract trace links between the source model and the target model. The trace links facilitate determining which target model elements were formed from which source model elements.

To determine (e.g., extract) the trace links between the source and target models, the traceability model matching system receives the source and target models. In some implementations, the source and target models are imported into a common data model. In this manner, the source model and the target model have a common basis for matching algorithms, detailed further below. The traceability model matching system processes the source and the target models to generate similarity values between the elements of the source model and the target model. In some examples, the matching algorithms are applied to the source model and the target model to identify model elements that refer to the same conceptual entity. The traceability model matching system generates a similarity value construct based on the similarity values. In some implementations, each matching algorithm provides similarity values for all source and target model element combinations and generates a respective similarity value matrix. The matrices (e.g., one matrix for each matching algorithm) are arranged in a similarity value construct (e.g., a similarity value cube (SVC)). The SVC is configured to derive a mapping (or matches) between the source elements and the target elements. The traceability model matching system identifies matching elements between the source model and the target model based on the similarity value construct. In some examples, the mapping is analyzed and trace links are extracted between the source model and the target model.

Figure 1:
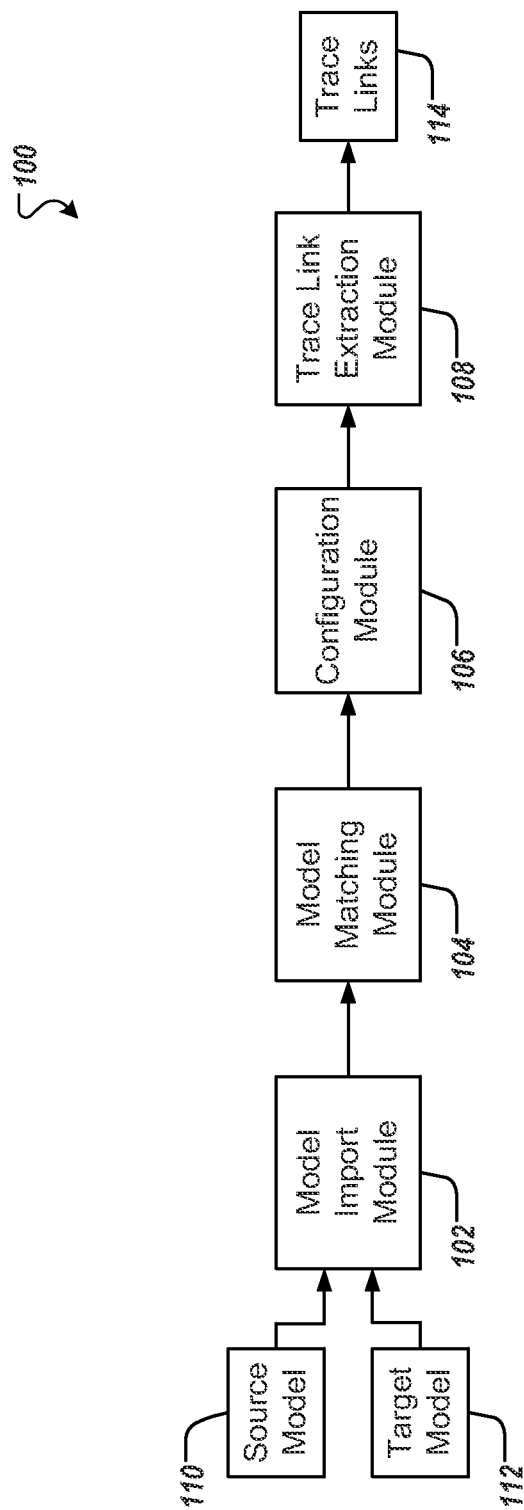
FIG. 1 is a block diagram of a traceability model matching system.

FIG. 1 is a block diagram of a traceability model matching system 100. The traceability model matching system 100 includes a model import module 102, a model matching module 104, a configuration module 106, and a trace link extraction module 108.

The model import module 102 receives a source model 110 and a target model 112. In some examples, the source model 110 and the target model 112 are each transformed to a common data model. In some implementations, the common data model is an internal data model to the system 100. For example, the source model 110 and the target model 112 can be provided in different model languages. Consequently, the source model 110 and the target model 112 are transformed into a similar format (e.g., a format of the common data model). In some implementations, the system 100 includes an import module 102 for each source model 110 and data model 112, dependent upon the language of the source model 110 and the data model 112. Furthermore, as mentioned above, the matching algorithms can be operable on the common data model. Consequently, the source model 110 and the target model 112 are transformed into the common data model such that the matching algorithms can be applied to the source model 110 and the target model 112. In some implementations, the common data model includes a graph structure. In some examples, the graph structure can facilitate uniform and adequate expression of the source model 110 and the target model 112 and expression of the source model 110 and the target model 112 in relation to corresponding meta-models. In some examples, the graph structure can include type attributed graphs. In some implementations, the system 100 can employ individual matching algorithms for each source model 110 and target model 112. In some implementations, the source model 110 and/or the target model 112 can be abstractions of text, e.g., software language text.

The model matching module 104 process the source model 110 and the target model 112 to generate similarity values between elements of the source model 110 and the target model 112. To that end, model matching is employed to find a mapping between the source model 110 and the target model 112 based on a given similarity measure. For each source-target element combination, a similarity value is determined according to a predefined similarity measure. The resulting similarities are analyzed and matches are derived between the source-target element combinations. In some examples, different similarity measures derive differing similarity values between each source-target element combination. For example, each source element is compared with each target element employing the matching algorithms, and for each comparison, similarity values can be determined. Based on the similarity values between each source-target element combination, it is determined whether the source-target element combinations are matched. To that end, and in some implementations, the matching algorithms can include an attribute similarity measure (ATTRIBUTES), a connection similarity measure (CONNECTIONS), and an instance-of similarity measure (INSTANCEOF). In some examples, the similarity values can be between 0 and 1, where, the higher the similarity value, the higher the similarity between the source-target element combinations.

In some implementations, the attribute similarity measure includes determining similar elements from the source model 110 and the target model 112 by indication of shared attributes (e.g., characteristics or values) of the source model 110 and the target model 112 elements. The model matching module 104 compares the attributes of each source element to the attributes of each target element, and dependent on the attribute similarity measure algorithm employed, the model matching module 104 determines a similarity value for each source-target element combination based on the attributes of the source-target element combination. For each source-target graph node combination containing data nodes, the attribute similarity value is determined. In some examples, for each source-target graph node combination, the data (e.g., attribute) nodes of the source graph node and the data (e.g., attribute) nodes of the target graph node are determined. The attribute similarity measure is determined for each source-target attribute data node combination for each source-target graph node combination and is stored in an attribute similarity matrix. In some examples, the attribute similarity matrix is reduced to a single attribute similarity value dependent upon the selection strategy applied to the attribute similarity matrix. This single attribute similarity value is the attribute similarity value between two given source-target graph nodes. In some implementations, the data nodes can include labels (i.e., strings).

In some implementations, the connection similarity measure includes propagating the similarity value of child source-target graph node combinations to parent source-target graph node combinations. In other words, the source-target parent graph node combinations inherent the similarity values of its child source-target graph node combinations. For example, two parent graph nodes from the source model 110 and the target model 112 that have similar children graph nodes will likely refer to the same entity. For each parent source-target graph node combination, the child graph nodes of the source parent graph node and the child graph nodes of the target parent graph node are determined. The combination similarity measure is determined for each source-target child graph node combination of each source-target parent graph node combination and placed in a connection similarity matrix. The combination similarity matrix is reduced to a single combination value dependent upon the selection strategy applied to the connection similarity matrix. This single connection similarity value is the connection similarity value between two given parent source-target graph nodes.

Example algorithms that can be used in implementations of the present disclosure include algorithms A-D, provided below.

---

Require: compare : $D_S^1 \times D_S^2 \rightarrow$ similarityValues
Ensure: dataNode$_{source} \in D_S^1 \subseteq V_D^1$
Ensure: dataNode$_{target} \in D_S^2 \subseteq V_D^2$
    1: function COMPUTESIMILIARITY (dataNode$_{source}$, dataNode$_{target}$)
    2:     returncompare (dataNode$_{source}$, dataNode$_{target}$)
    3: end function
Ensure: $s_i \in V_G^1$
Ensure: $t_j \in V_G^2$
    4: function MATCHATTRIBUTES ($s_i$, $t_j$)
    5:     Nodes$_{source}^{ATT} \leftarrow \{$target$_{NA}^1$ (e) | e $\in E_{NA}^1$ and source$_{NA}^1$ (e) = $s_i\}$
    6:     Nodes$_{target}^{ATT} \leftarrow \{$target$_{NA}^2$ (e) | e $\in E_{NA}^2$ and source$_{NA}^2$ (e) = $t_j\}$
    7:     for all $s_{i_k} \in$ Nodes$_{source}^{ATT}$, k = $\{1,..., |V_D^1|\}$ do
    8:         for all $t_{j_l} \in$ Nodes$_{target}^{ATT}$, l = $\{1,..., |V_D^2|\}$ do
    9:             SIM$_{Max(k)Max(l)}^{ATT} \ni$ sim$_{i_k j_l} \leftarrow$ computeSimiliarity($s_{i_k}$, $t_{j_l}$)
  10:         end for
  11:     end for
  12:     return computeSetSimiliarity(SIM$_{Max(k)Max(l)}^{ATT}$)
  13: end function
  14: function MATCHCONNECTEDNODES ($s_i$, $t_j$)
  15:     Nodes$_{source}^{Con} \leftarrow \{$target$_G^1$ (e) | e $\in E_G^1$ and source$_G^2$ (e) = $s_i\}$
  16:     Nodes$_{target}^{CON} \leftarrow \{$target$_G^2$ (e) | e $\in E_G^2$ and source$_G^2$ (e) = $t_j\}$
  17:     for all $s_{i_p} \in$ Nodes$_{source}^{CON}$, p = $\{1,..., |V_G^1| - 1\}$ do
  18:         for all $t_{j_q} \in$ Nodes$_{target}^{CON}$, q = $\{1,..., |V_G^2| - 1\}$ do
  19:             SIM$_{Max(p)Max(q)}^{CON} \ni$ sim$_{i_p j_q} \leftarrow$ matchAttributes ($s_{i_p}$, $t_{j_q}$)
  20:         end for
  21:     end for
  22:     return computeSetSimiliarity(SIM$_{Max(p)Max(q)}^{CON}$)
  23: end function
End

---

Algorithm A: determining an attribute similarity value and a connection similarity value

---

Require: AG$^1$ = (G$^1$, D$^1$) and AG$^2$ = (G$^2$, D$^1$)
Require: G$^1$ = (V$_G^1$, V$_D^1$, E$_G^1$, E$_{NA}^1$, E$_{EA}^1$, (source$_j^1$, target$_j^1$)$_j \in \{G, NA, EA\}$)
Require: G$^2$ = (V$_G^2$, V$_D^2$, E$_G^2$, E$_{NA}^2$, E$_{EA}^2$, (source$_j^2$, target$_j^2$)$_j \in \{G, NA, EA\}$)
Require: D$^1$ = (S$_D^1$, OP$_D^1$) and D$^2$ = (S$_D^2$ OP$_D^2$)
Require: similarityValues = $\{r | r \in \mathbb{R}$ and $0 \le r \le 1\} \cup \{$UNKNOWN$\}$
Ensure: similarityMeasure $\in \{$ATTRIBUTES, CONNECTIONS$\}$
    1: procedure MATCHGRAPHS (AG$^1$, AG$^2$, similarityMeasure)
    2:     for all $s_i \in V_G^1$, i = $\{1,..., |V_G^1|\}$ do
    3:         for all $t_j \in V_G^2$, j = $\{1,..., V_G^2|\}$ do
    4:             SIM$_{|V_G1||V_G2|} \ni$ sim$_{ij} \leftarrow$ matchNodes($s_i$, $t_j$, similarityMeasure)
    5:         end for
    6:     end for
    7:     matches $\leftarrow$ retrieveMatches SIM$_{|V_G1||V_G2|}$
    8: end procedure
Ensure: $s_i \in V_G^1$
Ensure: $t_j \in V_G^2$
    9: function MATCHNODES ($s_i$, $t_j$, similarityMeasure)
  10:     if similiarityMeasure = ATTRIBUTES then
  11:         return matchAttributes ($s_i$, $t_j$)
  12:     else if similiarityMeasure = CONNECTIONS then
  13:         return matchConnectedNodes ($s_i$, $t_j$)
  14:     end if
  15:     return UNKNOWN
  16: end function
end Algorithm B: mapping between the source model and the target model

---

Ensure: $s_i \in V_G^1$ and $Node_{source}^{ATT\_Type} \in V_G^1$
Ensure: $tj \in V_G^2$ and $Node_{target}^{ATT\_Type} \in V_G^2$
Ensure: typeSimilarityMeasure $\in$ similarityMeasure \
Ensure: typeSimilarityMeasure $\in$ similarityMeasure \ {INSTANCEOF}
1: function MATCHNODETYPES $(s_i, t_j)$
2:     $Nodes_{source}^{ATG\_Type} \leftarrow t^1(s_i)$
3:     $Nodes_{target}^{ATG\_Type} \leftarrow t^2(t_j)$
4:     return matchNodes $(Node_{source}^{ATT\_Type}, Node_{target}^{ATT\_Type},$ typeSimilarityMeasure)
5: end function
end

---

Algorithm C: determining the instance-of similarity value

---

Require: $AG^1 = (G^1, D^1)$ and $AG^2 = (G^2, D^2)$
Require: $G^1 = (V_G^1, V_D^1, E_G^1, E_{NA}^1, E_{EA}^1, (source_j^1, target_j^1))_j \in \{G, NA, EA\})$
Require: $G^2 = (F_G^2, F_D^2, E_G^2, E_{NA}^2, E_{EA}^2, (source_j^2, target_j^2))_j \in \{G, NA, EA\})$
Require: $ATG^1 = (TG^1, Z^1)$ with $Z^1$ as final algebra of $D^1$
Require: $ATG^2 = (TG^2, Z^2)$ with $Z^2$ as final algebra of $D^2$
Require: $TG^1 = (G^1, Z^1)$ and $TG^2 = (G^2, Z^2)$
Require: $G^1 = (V_G^1, V_D^1, E_G^1, E_{NA}^1, E_{EA}^1, (Source_j^1, Target_j^1))_j \in \{G,NA, EA\})$
Require: $G^2 = (V_G^2, V_D^2, E_G^2, E_{NA}^2, E_{EA}^2, (Source_j^2, Target_j^2))_j \in \{G, NA, EA\})$
Require: $TAG^1 = (AG^1, t^1)$ over $ATG^1$ with $t^1 : AG^1 \to ATG^1$
Require: $TAG^2 = (AG^2, t^2)$ over $ATG^2$ with $t^2 : AG^2 \to ATG^2$
Require: similarityValues = $\{r | r \in \mathbb{R} \text{ and } r \geq 0 \text{ and } r \leq 1\} \cup \{UNKNOWN\}$
Ensure: similarityMeasure $\in$ {ATTRIBUTES, CONNECTIONS, INSTANCEOF}
    1: procedure MATCHTYPEDGRAPHS $(TAG^1, TAG^2,$ similarityMeasure)
    2:      matchGraphs $(AG^1, AG^2,$ similarityMeasure)
    3: end procedure
Ensure $(s_i, t_j) \in (V_G^1 \times V_G^2 \cup (V_G^1 \times V_G^2)$
    4: function MATCHNODES $((s_i, t_j),$ similarity Measure)
    5:      if similarityMeasure = ATTRIBUTES then
    6:         return matchAttributes $(s_i, t_j)$
    7:      else if similarityMeasure = CONNECTIONS then
    8:         return matchConnectedNodes $(s_i, t_j)$
    9:      else if similarityMeasure = INSTANCEOF then
   10:         return matchNodeTypes $(s_i, t_j)$
   11:      end if
   12:      return UNKNOWN
   13: end function
end

---

Algorithm D: mapping between the source model and the target model

G indicates a graph, AG indicates an attributed graph, $D_S$ indicates a data sort (a set of data nodes of the same sort, that is, with labels of the same language, e.g. String), D indicates an algebraic signature, where $S_D$ indicates the set S of sorts for D, and $OP_D$ indicates a family of n-ary operations on $S_D$, Z indicates the final algebra of D, ATG indicates an attributed typed graph, V indicates a set of graph nodes ($V_G$ graph nodes, $V_D$ data nodes), E indicates a set of graph edges ($E_G$ usual graph edges and special edges $E_{NA}$ and $E_{EA}$ used for node resp. edge attribution), and TAG indicates a typed attributed graph. Also, italicized passages indicate reference to the meta-model. Example algorithm A provides for determining an attribute similarity value and a connection similarity value.

The attribute similarity value and the connection similarity value can be employed to match the source model 110 and the target model 112 and provide a mapping between the source and the target graph nodes. Example algorithm B provides for mapping between the source model 110 and the target model 112. Algorithm B utilizes the matchAttributes and the matchConnectedNodes functions provided in Algorithm A.

The instance-of similarity measure includes matching graph nodes of the source model 110 and the target model 112 based on matching between source and target meta-models. In other words, the instance-of similarity measure includes propagating the similarity of meta-model nodes to respective model nodes. Specifically, for each source-target graph node combination, the corresponding meta-model graph nodes are determined. For each meta-model graph node combination, an instance-of similarity value is determined. The instance-of similarity value of each meta-model source-target graph node combination is propagated to the corresponding model source-target graph node combination and placed in an instance-of similarity matrix. The instance-of similarity matrix is reduced to a single instance-of similarity value dependent upon the selection strategy applied to the instance-of similarity matrix. This single instance-of similarity value is the instance-of similarity value between two given source-target graph nodes.

Example algorithm C provides for determining the instance-of similarity value. Algorithm C employs the matchNodes function provided in Algorithm B.

The instance-of similarity value can be employed to match the source model 110 and the target model 112 and provide a mapping between the source and the target graph nodes. Example algorithm D provides for mapping between the source model 110 and the target model 112. Algorithm D employs the matchGraphs function defined in Algorithm B and the matchNodeTypes function defined in Algorithm C.

In some implementations, additional matching algorithms can also be in employed by the model matching module 104 in conjunction with the above-mentioned matching algorithms. For example, a graph edit distance (GED) algorithm and/or a pattern matcher algorithm can be employed. The GED algorithm determines a similarity of two given source-target element combinations based on a connection of the source-target element combination in a common subgraph. The pattern matcher algorithm determines a similarity of two given source-target element combinations based on a recurring pattern in the source and the target model.

The configuration module 106 generates a similarity value construct based on the similarity measures. Specifically, each matching algorithm provides similarity values between elements of the source model 110 and the target model 112, with the similarity values placed in a respective similarity value matrix. The similarity value matrices are arranged into a similarity value construct, or a similarity value cube (SVC). To provide a mapping (or matching) between source-target element combinations from the SVC, the SVC is configured to form an aggregation matrix by either determining the average of the similarity values or by selecting all similarity values exceeding a threshold. Further, the selection of how the SVC is configured can affect the quality of matching results.

The trace link extraction module 108 matches elements between the source model 110 and the target model 112 based on the similarity value construct. Specifically, the trace link extraction module 108 analyzes the mapping and extracts trace links 114 between the source model 110 and the target model 112. For example, a trace link 114 can be extracted between the source model 110 and the target model 112 when the similarity value, as provided in the SVC, between a source-target element combination is above a threshold.

Figure 2:
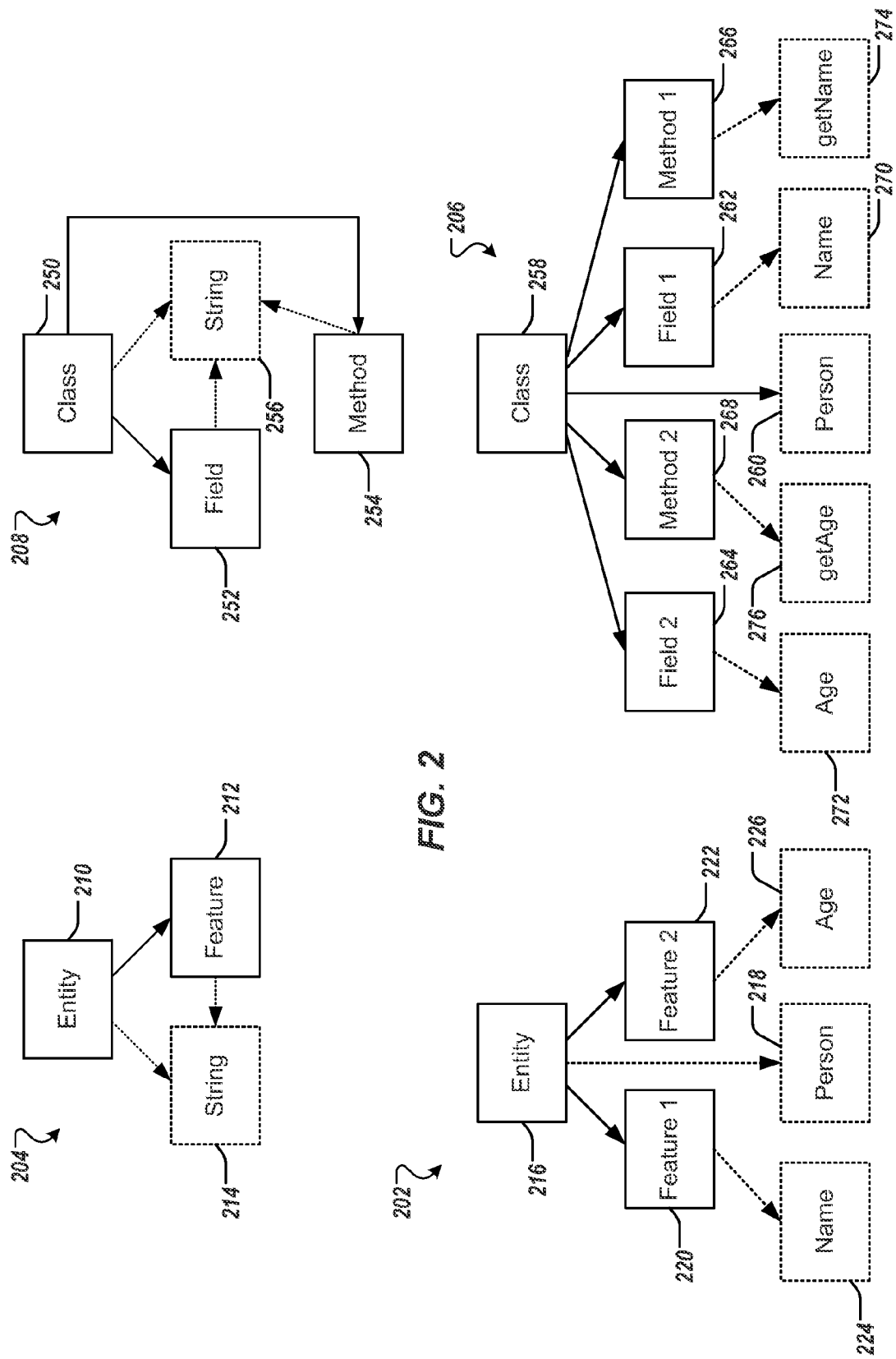
FIG. 2 show instances of a source model and a target model according to respective meta-models.

FIG. 2 show instances of a source model 202 and a target model 206 according to respective meta-models. Specifically, the source model 202 is an instance of the source meta-model 204 and the target model 206 is an instance of the target meta-model 208. The source model 202 and the target model 206 can be imported to the system 100 by the model import module 102. The source model 202 and the target model 206 can be analogous to the source model 110 and the target model 112, respectively, mentioned above with respect to FIG. 1.

The source meta-model 204 includes an entity graph node 210 that has a child feature graph node 212. The entity graph node 210 and the feature graph node 212 both contain a string data node 214. Further, the source model 202 includes an entity graph node 216 that contains a data node 218 of "person." The entity graph node 216 has child nodes of feature1 graph node 220 and feature2 graph node 222. Feature1 graph node 220 contains a data node 224 of "name" and feature2 graph node 222 contains a data node 226 of "age."

The target meta-model 208 includes a class graph node 250 that has a child field graph node 252 and a child method graph node 254. The class graph node 250, the child field graph node 252, and the child method graph node 254 contain a string data node 256. Further, the target model 206 includes a class graph node 258 that contains a data node 260 of "person." The class graph node 258 has child nodes of field1 graph node 262, field2 graph node 264, method1 graph node 266, and method2 graph node 268. Field1 graph node 262 contains a data node 270 of "name;" field2 graph node 264 contains a data node 272 of "age;" method1 graph node 266 contains a data node 274 of "getName;" and method2 graph node 268 contains a data node 276 of "getAge."

Figure 3:
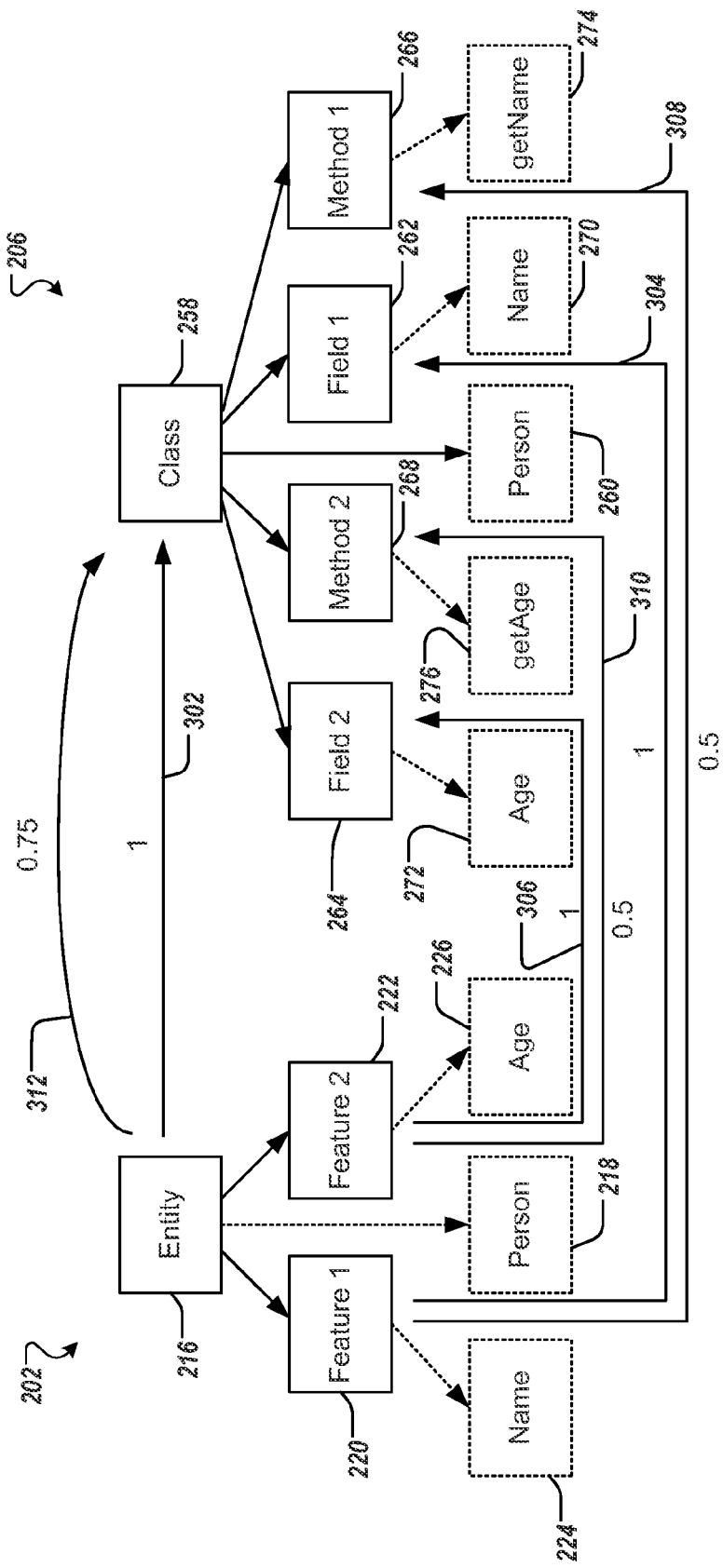
FIG. 3 shows an example of a model matching process utilizing the attribute similarity values and the connection similarity values.

FIG. 3 shows an example of a model matching process utilizing the attribute similarity values and the connection similarity values. Specifically, FIG. 3 includes mappings between the source model 202 and the target model 206. To that end, employing Algorithms A and B, the product of the set of all source graph nodes (e.g., entity graph node 216, feature1 graph node 220, and feature2 graph node 222) and the set of all target graph nodes (e.g., class graph node 258, field1 graph node 262, field2 graph node 264, method1 graph node 266, and method2 graph node 268) is determined, providing a similarity matrix (for each of the attribute similarity values and of the connection similarity values) of fifteen cells for each source-target graph node combination. The similarity values can be based on the attribute similarity values and/or the connection similarity values.

To that end, when the similarity values are based on the attribute similarity values, the data nodes of each source-target graph node combination are retrieved, and the attribute similarity values are determined. The attribute similarity values are dependent on the specific algorithm employed, (e.g., the computeSimiliarity function of Algorithm A). In some examples, the similarity values are determined such that, for given data sorts $D_S^1 = D_S^1 = \text{String}$, with $v \in D_S^1$ and $w \in D_S^2$, the function compare: $D_S^1 \times D_S^2 \rightarrow \text{similarityValues}$ can be defined as:

$$\text{compare}(v, w) = \begin{cases} 1, & \text{if } v = w \\ 0, 5, & \text{if } v \subseteq w \\ 0, & \text{if } v \neq w \end{cases}$$

Continuing the example, for the source-target graph node combination of entity graph node 216 and class graph node 258, the data nodes 218 and 260 are retrieved. Since the labels (i.e., strings) of data nodes 218 and 260 are identical (e.g., contain the attribute "person"), a similarity value of 1 (or any value between 0 and 1) is assigned to the source-target graph node combination of entity graph node 216 and class graph node 258. Analogously, for the source-target graph node combination of feature1 graph node 220 and class graph node 258, a similarity value of 0 is determined, since the data node 224 and the data node 260 are not identical (the data node 224 contains the attribute "name" and the data node 260 contains the attribute "person"). Similarly, the above compare function can be applied to each of the remaining source-target graph node combination of the source model 202 and the target model 206, as shown by Table 1.

TABLE 1

Example similarity values of graph nodes.

| | class | field1 | field2 | method1 | method2 |
|---|---|---|---|---|---|
| entity | 1 | 0 | 0 | 0 | 0 |
| feature1 | 0 | 1 | 0 | 0.5 | 0 |
| feature2 | 0 | 0 | 1 | 0 | 0.5 |

The resulting mapping of the source-target graph node combinations is depicted in FIG. 3. Specifically, line 302 includes a value of 1 and represents the similarity value between entity graph node 216 and class graph node 258; line 304 includes a value of 1 and represents the similarity value between feature1 graph node 220 and field1 graph node 262; line 306 includes a value of 1 and represents the similarity value between feature2 graph node 222 and field2 graph node 264; line 308 includes a value of 0.5 and represents the similarity value between feature1 graph node 220 and method1 graph node 266; and line 310 includes a value of 0.5 and represents the similarity value between feature2 graph node 222 and method2 graph node 268.

To that end, when the similarity values are based on the connection similarity measure, the children graph nodes of each source-target graph node combination are retrieved, and the similarity values are determined. For example, the feature1 graph node 220 and feature2 graph node 222 are retrieved for the entity graph node 216 and field1 graph node 262, field2 graph node 264, method1 graph node 266, and method2 graph node 268 are retrieved for the class graph node 258. To that end, for each child source-target graph node combination, a similarity value is determined based on the similarity values of Table 1, resulting in a similarity value matrix. In some implementations, the similarity value matrix is reduced to a singularly value by taking the average of all values from corresponding child source-target graph node combinations. Continuing the example, a similarity value of 0.75 (average of lines 304-310) is determined and propagated to the parent source-target graph node combination of entity graph node 216 and class graph node 258, denoted by line 312.

Figure 4:
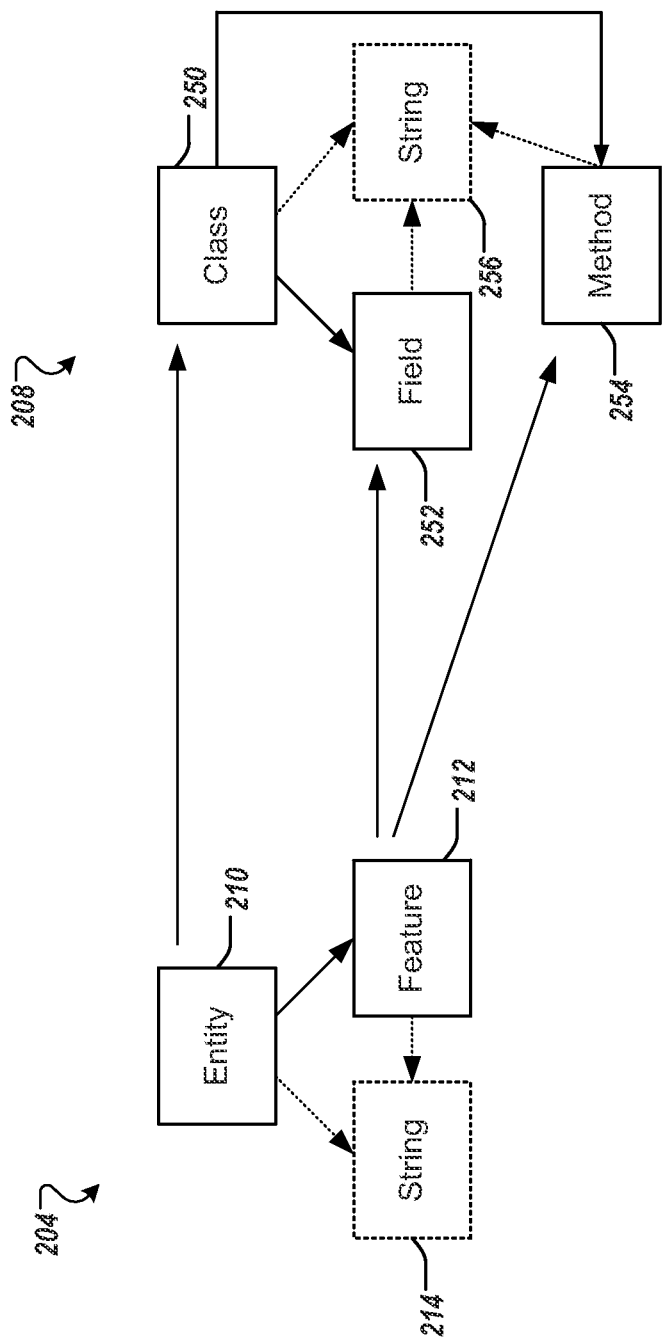
FIG. 4 shows an example of a meta-model mapping.

FIG. 4 shows an example of a meta-model mapping. Specifically, FIG. 4 includes mappings between the source meta-model 204 and the target meta-model 208. Specifically, the entity graph node 210 of the source meta-model 204 is mapped to the class graph node 250 of the target meta-model 208. Further, the feature graph node 212 of the source meta-model 204 is mapped to the field graph node 252 and the method graph node 254 of the target meta-model 208.

Figure 5:
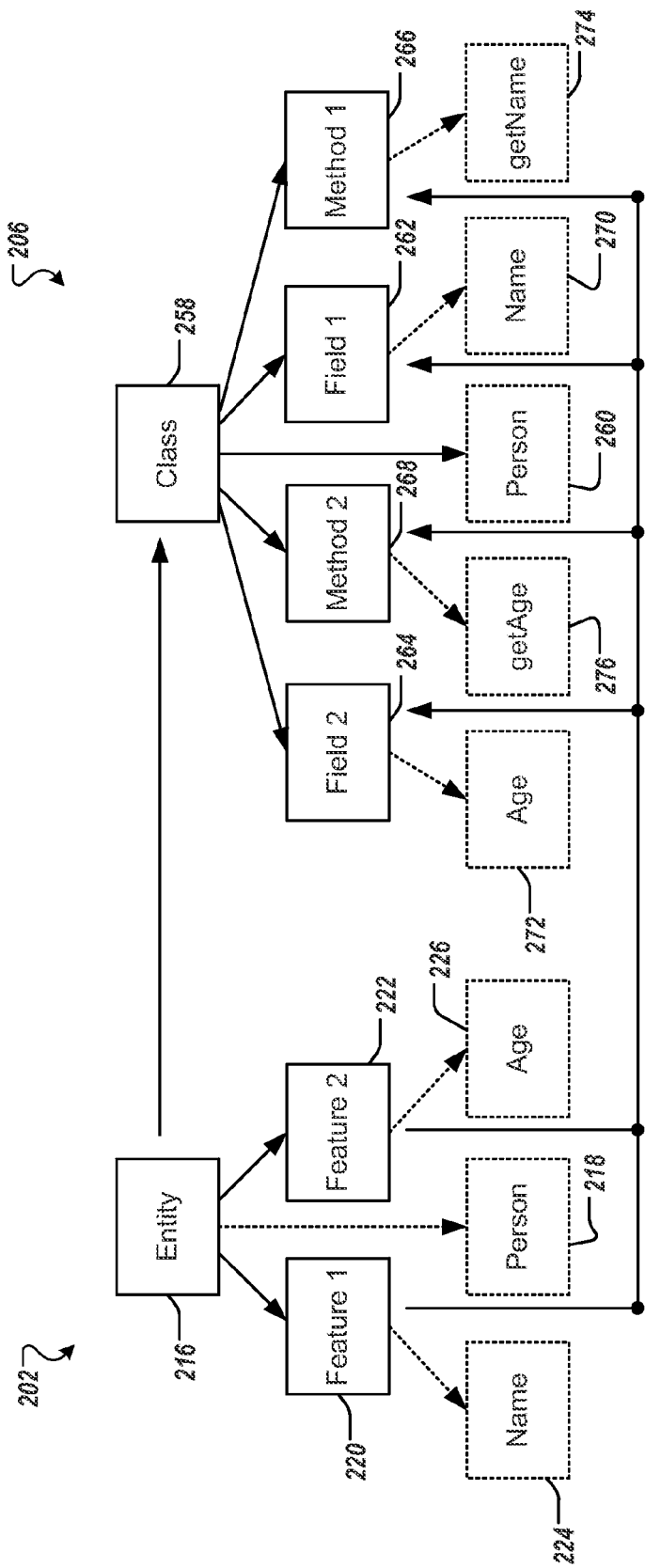
FIG. 5 shows an example of a model matching process utilizing the instance-of similarity measures and the meta-model mapping.

FIG. 5 shows an example of a model matching process utilizing the instance-of similarity measures and the meta-model mapping of FIG. 4. Specifically, FIG. 5 includes mappings between the source model 202 and the target model 206. To that end, employing Algorithms C and D, the product of the set of all source graph nodes (e.g., entity graph node 216, feature1 graph node 220, and feature2 graph node 222) and the set of all target graph nodes (e.g., class graph node 258, field1 graph node 262, field2 graph node 264, method1 graph node 266, and method2 graph node 268) is determined, providing an instance-of similarity matrix of fifteen cells for each source-target graph node combination.

For each source-target graph node combination, a similarity value is determined between the nodes of the source meta-model 204 and the target meta-model 208. For example, the entity graph node 210 of the source meta-model 204 corresponds to the entity graph node 216 of the source model 202. Further, since a mapping exists between the entity graph node 210 of the source meta-model 204 and the class graph node 250 of the target meta-model 208, the similarly value of 1 (or any value between 0 and 1) is propagated to the corresponding source-target graph node combination of the entity graph node 216 of the source model 202 and the class graph node 258 of the target model 208. Similarly, the similarity of the entity graph node 216 of the source model 202 and the field graph node 262 of the target model 206 can be determined. However, since the entity graph node 210 of the source meta-model 204 and the field graph node 252 of the target meta-model 208 do not match, the similarity of the source-target graph node combination of the entity graph node 216 and the field graph node 262 is 0. Similarly, the above can be applied to the remaining source-target graph node combinations of the source model 202 and the target model 206 and propagated to the corresponding source-target graph node combinations of the source model 202 and the target model 208, as shown by Table 2.

TABLE 2

Example similarity values of AG nodes.

|          | class | field1 | field2 | method1 | method2 |
|----------|-------|--------|--------|---------|---------|
| entity   | 1     | 0      | 0      | 0       | 0       |
| feature1 | 0     | 1      | 1      | 1       | 1       |
| feature2 | 0     | 1      | 1      | 1       | 1       |

Figure 6:
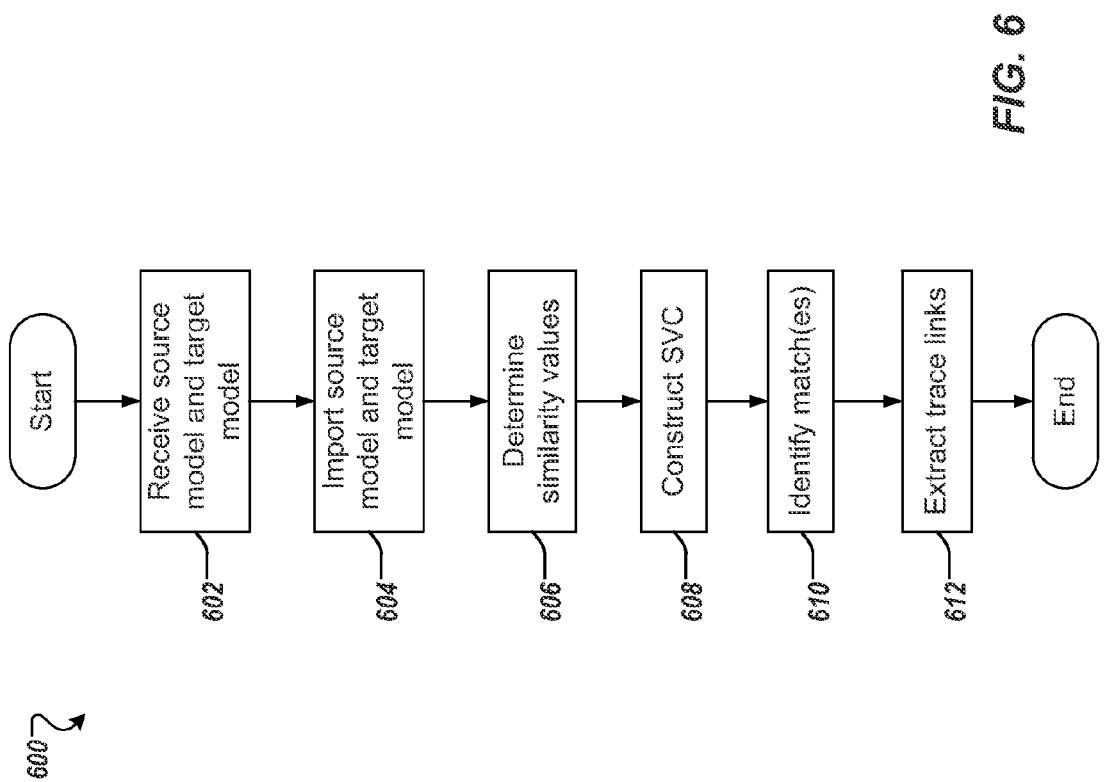
FIG. 6 is a flowchart of an example process that can be executed in accordance with implementations of the present disclosure.

FIG. 6 is a flowchart of an example process 600 that can be executed in accordance with implementations of the present disclosure. The example process 600 can be executed using one or more computing devices.

The source model and the target model are received (602). For example, the model import module 102 receives the source model 110 (or the source model 202) and the target model 112 (or the target model 206). In some implementations, the source model 110 and the target model 112 data can be retrieved from computer-readable memory. The source model and the target model are imported (604). For example, the model import module 102 imports source model 110 (or the source model 202) and the target model 112 (or the target model 206) into a common data model of the system 100. Similarity values between the source model and the target model are determined (606). For example, the model matching module 104 generates similarity values between the source model 110 (or the source model 202) and the target model 112 (or the target model 206). The similarity values can include, among others, the attribute similarity values, the connections similarity values, and the instance-of similarity values. Further, each matching algorithm of the model matching module 104 provides similarity values for all source-target model node combinations and generates a respective similarity value matrix. The SVC is constructed (608). For example, the configuration module 106 constructs the SVC based on the similarity values between the source model 110 (or the source model 202) and the target model 112 (or the target model 206). To provide a mapping (or matching) between source-target node combinations from the SVC, the SVC is configured to form an aggregation matrix by either determining the average of the similarity values or by selecting all similarity values exceeding a threshold. Match(es) between elements of the source model and the target model are identified (610). For example, the trace link extraction module 108 identifies matches between nodes of the source model 110 (or the source model 202) and the target model 112 (or the target model 206) based on the SVC. Trace links are extracted between the source model and the target model (612). For example, the trace link extraction module 108 analyzes the match(es) between elements of the source model 110 (or the source model 202) and the target model 112 (or the target model 206), and extracts trace links based on these match(es).

Figure 7:
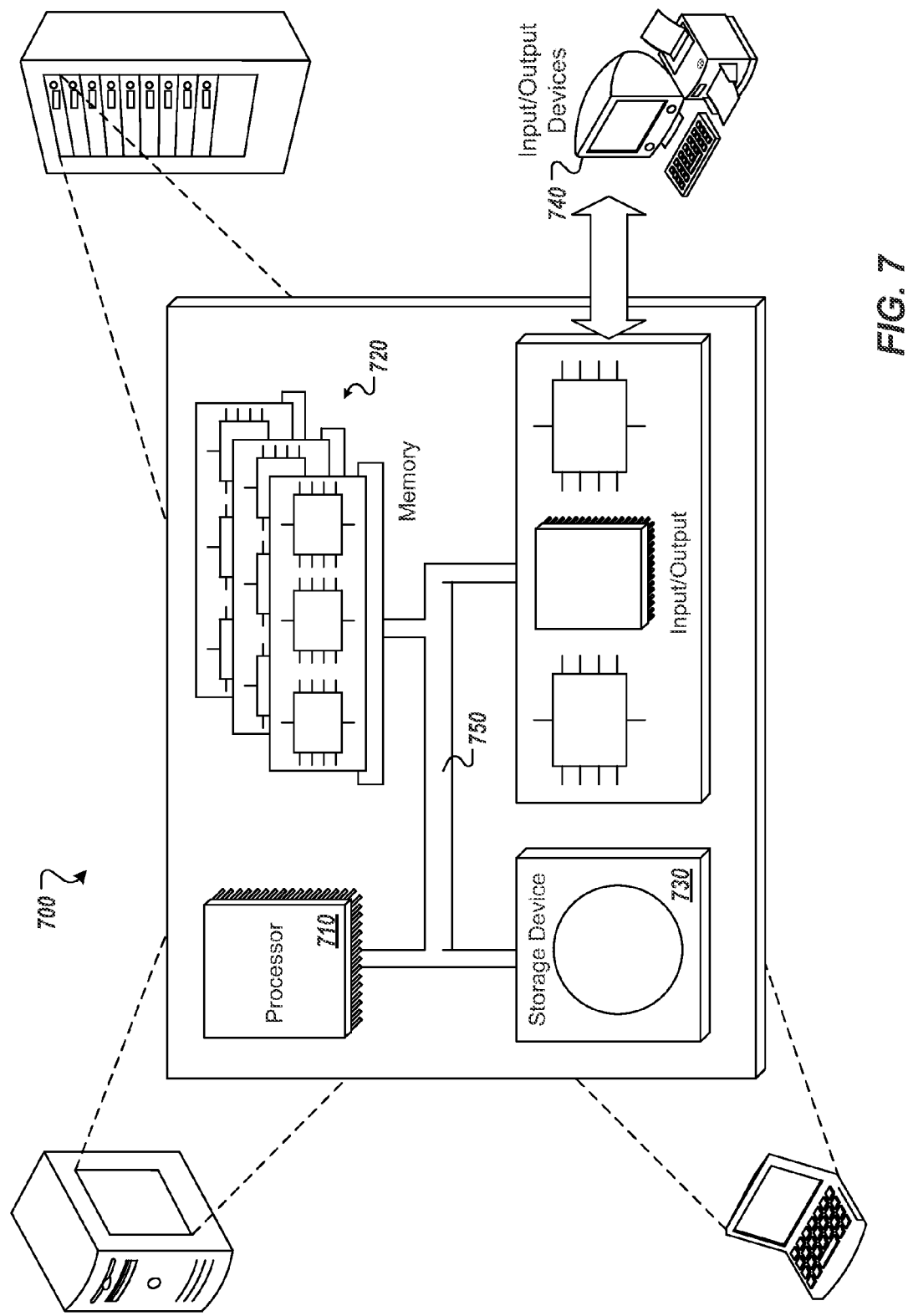
FIG. 7 is a schematic illustration of example computer systems that can be used to execute implementations of the present disclosure.

Referring now to FIG. 7, a schematic diagram of an example computing system 800 is provided. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for identifying matching elements between a source model and a target model, the method comprising:
   receiving a source model and a target model, the source model including one or more source elements and the target model including one or more targets elements, the source model and the target model each being stored in computer-readable memory;
   processing the source model and the target model based on two or more matching algorithms, the processing including:
      calculating, for each matching algorithm, a similarity value for each combination of the source element and the target element, and
      generating, for each matching algorithm, a similarity value matrix based on the similarity values associated with the matching algorithm;
   generating a similarity value cube based on the similarity value matrix associated with each matching algorithm; and
   identifying matching elements between the source model and the target model based on the similarity value cube.

2. The method of claim 1, wherein the target model is provided based on a transformation of the source model.

3. The method of claim 1, further comprising converting a data structure of the source model to a data structure of a common data model.

4. The method of claim 1, further comprising converting a data structure of the target model to a data structure of a common data model.

5. The method of claim 1, wherein the two or more matching algorithms include an attribute similarity measure, a connection similarity measure and an instance-of similarity measure.

6. The method of claim 1, wherein the processing further includes comparing, for each combination of the source element and the target element, an attribute of the source element to an attribute of the target element.

7. The method of claim 1, wherein processing further includes propagating, for each child combination of the source element and the target element, the similarity value of the child combination to a respective parent combination of the source model element and the target model element.

8. The method of claim 1, wherein processing further includes:
   determining, for each combination of the source model element and the target model element, a corresponding combination of a source meta-model element and a target meta-model element; and propagating, for each combination of the source meta-model element and the target meta-model element, a similarity value of the combination to the respective combination of the source model element and the target model element.

9. The method of claim 1, further comprising extracting one or more trace links based on the matching elements, each trace link associating an input element of the source model to an output element of the target model in view of a transformation rule.

10. A non-transitory computer-readable storage medium coupled to one or more processors and having instructions stored thereon which, when executed by the one or more processors, cause the one or more processors to perform operations for improving keyword searches, the operations comprising:
receiving a source model and a target model, the source model including one or more source elements and the target model including one or more target elements, the source model and the target model each being stored in computer-readable memory;
processing the source model and the target model based on two or more matching algorithms, the processing including:
calculating, for each matching algorithm, a similarity value for each combination of the source element and the target element, and
generating, for each matching algorithm, a similarity value matrix based on the similarity values associated with the matching algorithm;
generating a similarity value cube based on the similarity value matrix associated with each matching algorithm; and
identifying matching elements between the source model and the target model based on the similarity value cube.

11. The non-transitory computer-readable storage medium of claim 10, wherein the target model is provided based on a transformation of the source model.

12. The non-transitory computer-readable storage medium of claim 10, wherein the operation of processing further includes propagating, for each child combination of the source element and the target element, the similarity value of the child combination to a respective parent combination of the source model element and the target model element.

13. The non-transitory computer-readable storage medium of claim 10, wherein the operation of processing further includes:
determining, for each combination of the source model element and the target model element, a corresponding combination of a source meta-model element and a target meta-model element; and
propagating, for each combination of the source meta-model element and the target meta-model element, a similarity value of the combination to the respective combination of the source model element and the target model element.

14. The non-transitory computer-readable storage medium of claim 10, the operations further comprising extracting one or more trace links based on the matching elements, each trace link associating an input element of the source model to an output element of the target model in view of a transformation rule.

15. A system, comprising:
a computing device; and
a computer-readable storage device coupled to the computing device and having instructions stored thereon which, when executed by the computing device, cause the computing device to perform operations for improving keyword searches for enterprise services, the operations comprising:
receiving a source model and a target model, the source model including one or more source elements and the target model including one or more target elements, the source model and the target model each being stored in computer-readable memory;
processing the source model and the target model based on two or more matching algorithms, the processing including:
calculating, for each matching algorithm, a similarity value for each combination of the source element and the target element, and
generating, for each matching algorithm, a similarity value matrix based on the similarity values associated with the matching algorithm;
generating a similarity value cube based on the similarity value matrix associated with each matching algorithm; and
identifying matching elements between the source model and the target model based on the similarity value cube.

16. The system of claim 15, the operations further comprising converting a data structure of the source model to a data structure of a common data model.

17. The system of claim 15, the operations further comprising converting a data structure of the target model to a data structure of a common data model.

18. The system of claim 15, wherein the two or more matching algorithms include an attribute similarity measure, a connection similarity measure and an instance-of similarity measure.

* * * * *